US00RE50569E

(19) United States
(12) Reissued Patent
Dong et al.

(10) Patent Number: US RE50,569 E
(45) Date of Reissued Patent: *Sep. 2, 2025

(54) ASYMMETRIC LINEAR LED LUMINAIRE DESIGN FOR UNIFORM ILLUMINANCE AND COLOR

(71) Applicant: Lutron Technology Company LLC, Coopersburg, PA (US)

(72) Inventors: Fangxu Dong, Austin, TX (US); An Mao, Austin, TX (US)

(73) Assignee: Lutron Technology Company LLC, Coopersburg, PA (US)

( * ) Notice: This patent is subject to a terminal disclaimer.

(21) Appl. No.: 17/558,830

(22) Filed: Dec. 22, 2021

Related U.S. Patent Documents

Reissue of:
(64) Patent No.: 9,458,972
Issued: Oct. 4, 2016
Appl. No.: 14/516,818
Filed: Oct. 17, 2014

U.S. Applications:
(63) Continuation of application No. 16/152,106, filed on Oct. 4, 2018, now Pat. No. Re. 48,873, which is an application for the reissue of Pat. No. 9,458,972.

(51) Int. Cl.
*F21V 9/00* (2018.01)
*F21K 9/60* (2016.01)
(Continued)

(52) U.S. Cl.
CPC ..... *F21V 5/045* (2013.01); *F21K 9/60* (2016.08); *F21S 8/036* (2013.01); *F21S 8/046* (2013.01);
(Continued)

(58) Field of Classification Search
CPC ..... F21K 9/68; F21V 7/06; F21V 7/0008
See application file for complete search history.

(56) References Cited

U.S. PATENT DOCUMENTS 8,038,321 B1 10/2011 Franck et al.
8,529,102 B2 9/2013 Pickard et al.
(Continued)

FOREIGN PATENT DOCUMENTS

EP 1596125 A1 11/2005

OTHER PUBLICATIONS

"International Search Report and Written Opinion of the International Searching Authority", International Application No. PCT/IB2015/001911, mailing date Jan. 15, 2016, 15 pages.
(Continued)

*Primary Examiner* — James A Menefee
(74) *Attorney, Agent, or Firm* — Condo Roccia Koptiw LLP

(57) ABSTRACT

An LED lamp for illuminating a surface under a flat angle in linear lighting applications such as cove lighting and wall washing is provided. It produces a uniform intensity distribution and a uniform color output throughout the beam pattern of the light beam produced by a multi-color LED light source. The lamp comprises a body of an extruded profile. The body comprises at least one section with a mirrored surface and at least a lens section which allows exiting of light from the body. At least one LED preferably having a LED lens is provided at the inner side of the body. This combination of optical systems results in an asymmetric beam pattern from the source.

20 Claims, 4 Drawing Sheets

(51) Int. Cl.

| | |
|---|---|
| ***F21K 99/00*** | (2016.01) |
| ***F21S 8/00*** | (2006.01) |
| ***F21S 8/04*** | (2006.01) |
| ***F21V 5/00*** | (2018.01) |
| ***F21V 5/04*** | (2006.01) |
| ***F21V 7/00*** | (2006.01) |
| ***F21V 7/06*** | (2006.01) |
| ***F21V 7/22*** | (2018.01) |
| ***F21V 7/28*** | (2018.01) |
| *F21Y 101/00* | (2016.01) |
| *F21Y 103/10* | (2016.01) |
| *F21Y 113/13* | (2016.01) |
| *F21Y 115/10* | (2016.01) |

(52) U.S. Cl.

CPC ..... *F21V 5/008* (2013.01); *F21V 7/0008* (2013.01); *F21V 7/0025* (2013.01); *F21V 7/005* (2013.01); *F21V 7/06* (2013.01); *F21V 7/28* (2018.02); *F21Y 2101/00* (2013.01); *F21Y 2103/10* (2016.08); *F21Y 2113/13* (2016.08); *F21Y 2115/10* (2016.08)

(56) References Cited

U.S. PATENT DOCUMENTS

| | | | | |
|---|---|---|---|---|
| RE48,873 | E * | 1/2022 | Dong | F21S 8/036 |
| 2005/0094401 | A1 | 5/2005 | Magarill | |
| 2006/0285341 | A1 | 12/2006 | Yatsuda et al. | |
| 2007/0171631 | A1 | 7/2007 | Davis | |
| 2007/0247856 | A1 | 10/2007 | Wang et al. | |
| 2008/0204888 | A1 | 8/2008 | Kan et al. | |
| 2009/0279296 | A1* | 11/2009 | Chang | F21K 9/00 362/235 |
| 2010/0066249 | A1* | 3/2010 | Nagafuchi | B60Q 1/2607 315/77 |
| 2010/0214787 | A1 | 8/2010 | Lai | |
| 2010/0254128 | A1 | 10/2010 | Pickard et al. | |
| 2011/0058353 | A1* | 3/2011 | Yang | F21S 4/28 362/231 |
| 2011/0096548 | A1* | 4/2011 | Pickard | F21V 7/0025 362/294 |
| 2011/0164417 | A1 | 7/2011 | Huang | |
| 2013/0100667 | A1* | 4/2013 | Riendeau | F21V 7/06 362/240 |
| 2013/0292709 | A1 | 11/2013 | Tong et al. | |
| 2014/0084809 | A1* | 3/2014 | Catalano | H05B 45/10 315/295 |
| 2015/0159818 | A1 | 6/2015 | Dong et al. | |
| 2015/0159841 | A1 | 6/2015 | Logan et al. | |

OTHER PUBLICATIONS

European Patent Office, International Search Report and Written Opinion of the International Searching Authority, International Application No. PCT/IB2015/001911, mailing date Jan. 15, 2016.

* cited by examiner

ASYMMETRIC LINEAR LED LUMINAIRE DESIGN FOR UNIFORM ILLUMINANCE AND COLOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*Notice: More than one reissue application has been filed for the reissue of U.S. Pat. No. 9,458,972. The reissue applications are the present application and application Ser. No. 16/152,106, all of which are continuation reissues of U.S. Pat. No. 9,458,972. This is an application for reissue of U.S. Pat. No. 9,458,972. This application claims benefit under 35 U.S.C. 120 as a continuation of application Ser. No. 16/152,106, filed Oct. 4, 2018, which is an application for reissue of U.S. Pat. No. 9,458,972, issued Oct. 4, 2016, from application Ser. No. 14/516,818, filed Oct. 17, 2014.*

BACKGROUND OF THE INVENTION

1. Field of the Invention

The invention relates to a LED lamp and color mixing optics for illuminating a surface under a flat angle. The LED lamp produces a uniform intensity distribution and a uniform color output throughout the beam pattern of the light beam produced by a multi-color LED light source.

2. Description of Relevant Art

In linear lighting applications such as cove lighting and wall washing, it is desired to shape the beam of a lamp to achieve a uniform color and illuminance distribution on a target architecture surface, which may be a wall or a ceiling. As the illuminance incident on the target decreases as a function of the inverse of the light travelling distance (inverse-square law), the light intensity distribution from the lamp should be highly asymmetric. For example, a fluorescent pendant light which has a symmetric beam shape would illuminate the upper wall much brighter than the lower wall.

Color LED lamps should have an even intensity and color distribution over a broad range of radiation angles. As there is no single point LED source available, the radiation of multiple LED sources must be combined to form a multicolor light source. These multiple LED sources are placed offset to each other, so there is no common focal point. To obtain an even color distribution, color mixing is required.

Another important factor impacting the illumination uniformity is the setback distance, which is defined as the perpendicular distance between the luminaire aperture and the target surface. A small setback distance is usually preferred by lighting and architecture designers, but too short distance may reduce the uniformity, resulting in bright spots on the target plane.

U.S. Pat. No. 8,529,102 discloses a reflector system for a multi-color LED lamp providing color mixing. The system uses two reflective surfaces to redirect the light before it is emitted.

US Publication No. 2007/0171631 discloses LED cove lighting comprising a large and complex aluminum mirror system to obtain a uniform light distribution at a wall.

SUMMARY OF THE INVENTION

The embodiments are based on the object of making a LED lamp and a color mixing optic for color LED lamps which produces uniform intensity and color throughout the entire light beam when illuminating a surface under a flat angle. Furthermore, the optic should be simple, robust as well as easy and cost-effective to manufacture. The setback distance should be small compared to the length of the surface. Another embodiment is based on the object of making a color LED lamp comprising the color mixing optic.

In an embodiment, a lamp comprises a body which may further comprise a profile, preferably a hollow profile or an extruded profile. The body preferably comprises at least one section with a mirrored surface and at least a lens section which allows exiting of light from the body. At least one LED preferably having a LED lens is provided at the inner side of the body. This combination of optical systems results in an asymmetric beam pattern from the source.

At least one LED, preferably a plurality of LEDs are mounted on a LED mounting plane. It is mounted on a preferably planar mounting surface which preferably extends in a plane defined by the direction of extrusion. Preferably, a plurality of LEDs is aligned on a common center line, which preferably extends into the direction of extrusion. This mounting surface may comprise a printed circuit board or any other means for holding the at least one LED and preferably further electronic components. This embodiment relates to a color LED lamp and therefore requires multicolor LED emitters. These are preferably different LED chips combined to generate a plurality of visible colors. Herein, reference is made to a LED which means a plurality of LED chips for generating the different colors. Preferably, each LED is covered by a LED lens which preforms the beam pattern emitted by the LED and which further may protect the LED.

Close to the LED lens, the mirrored surface of the body has at least one paraboloidal section, preferably two paraboloidal sections. Preferably, at least one of the paraboloidal section has its focus line which is coincident with the LED center line. If a plurality of paraboloidal sections is provided, preferably at least two of these sections have the same focal length, and most preferably have the same focal line which is further preferably coincident with the LED center line. The paraboloidal sections deflect most of the light emitted by the at least one LED into a direction which is roughly parallel to the LED mounting plane and which exits the lamp through a first lens forming a first exit surface of the body. It is further preferred that the paraboloidal sections are slightly rotated around the focal line in a plane perpendicular to the direction of extrusion against each other. This results in a slightly different main beam direction of the lamp.

It is further preferred to have at least one arc-shaped reflector. Most preferably, there are three arc-shaped reflectors. These arc-shaped reflectors preferably are next to the at least one paraboloidal section. Preferably, they deflect a further part of the light through a second lens, under an angle which may be any flat angle up to a 90 degree angle to the mounting plane of the LED by means of the arc-shaped reflectors. Another part of the light is reflected towards the first lens.

For capturing residual light, a backside reflector may be provided at one side of the LED oriented towards the prime lens and set back from the mounting plane of the LED.

The embodiments described herein provide a better light distribution on a surface or wall with a reduced setback distance and provide an improved color mixing. The body is made of a robust profile and may be easily manufactured. It provides a fully enclosed housing which protects the LEDs and the inner optics from environmental influences.

BRIEF DESCRIPTION OF THE DRAWINGS

In the following, the invention will be described by way of example, without limitation of the general inventive concept, on examples of embodiment and with reference to the drawings.

Figure 1:
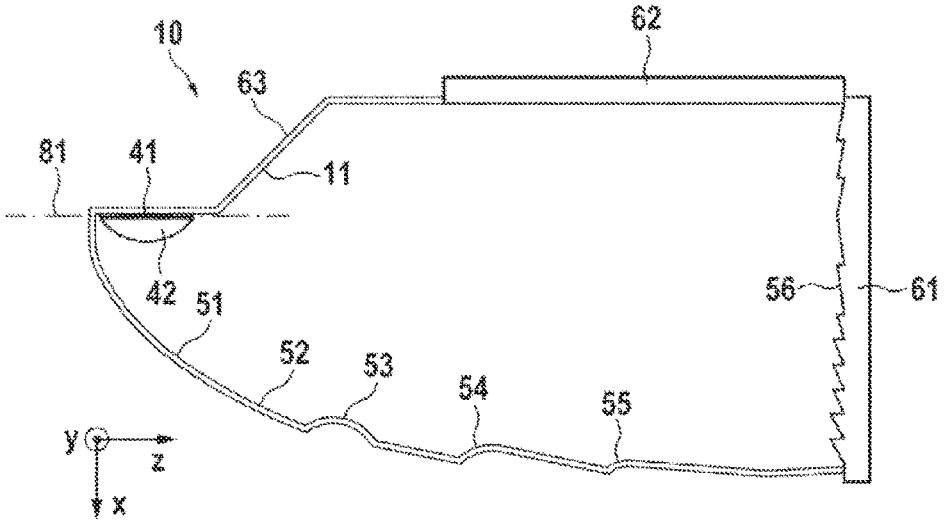
FIG. 1 shows a sectional view of a first embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1, a sectional view of a first embodiment is shown. The LED lamp 10 has a body 11 which may be based on an extruded profile, preferably an extruded metal or plastic profile. Preferably, the extrusion direction is the y direction as indicated. An LED 41 is held at an LED mounting plane 81 which is parallel to a y-z-plane with the coordinates shown. Preferably, a plurality of LEDs is aligned on a common center line, which preferably extends into the y direction. This embodiment relates to a color LED lamp and therefore requires multicolor LED emitters, which when combined provide a multi-color LED light source. The multicolor LED emitters are preferably different LED chips configured to generate a plurality of visible colors, which combine to produce blended light. Herein, reference is made to an LED which means a plurality of LED chips for generating the different colors. The LED is covered by an LED lens 42 which will be shown later in full detail. Approximately opposite to the LED lens 42, there is a first paraboloidal section 51 and a second paraboloidal section 52. In this embodiment, both paraboloidal sections preferably have the same focal line which is at or at least close to the LED 41 center line. It is further preferred, if the paraboloidal sections are rotated slightly against each other, as will be shown later in detail. It may be possible to include further paraboloidal sections. There are further three arc-shaped reflectors 53, 54, and 55 which are used to deflect the light from the LED through a second exit surface to the outside of the lamp.

Most of the light emitted by the LED is deflected by the paraboloidal sections. This light is radiated through a prime lens 56 defining a first exit surface. The prime lens has a lens body 61 and may have a Fresnel-lens like surface structure. The surface may have a plurality of slopes which define the light distribution at the output of the lamp. The light deflected by the arc-shaped reflectors 53, 54, and 55 is guided through an outside lens 62 forming a second exit surface of the lamp. Finally, there is a backside reflector 63 which is reflecting light rays back to the interior of the lamp.

The LED base plane, the paraboloidal sections, the arc-shaped reflectors, the lens body, the outside lens, and the backside reflector enclose the inner volume of the lamp. They form an elongated body which may be closed at its end by others, which may only be protective covers which may also have a reflective inner surface. At least one or all of the reflective surfaces in the lamp may be total reflecting surfaces or may be mirrored surfaces (or other reflecting coated surface) or a combination thereof.

Figure 2:
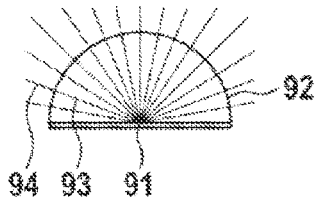
FIG. 2 shows a first embodiment of an LED with a lens.

In FIG. 2, a first embodiment of an LED 91 together with a lens 92 is shown. Here, the lens 92 is a semi-sphere with the LED 91 located at the center. As the light rays propagate under a right angle from the lens to the outside, there is no refraction generating a Lambertian output.

Figure 3:
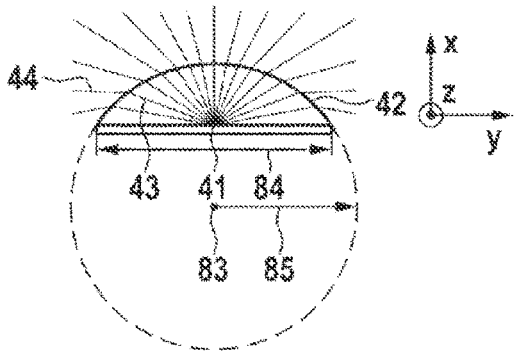
FIG. 3 shows a further LED lens.

In FIG. 3, a further LED lens is shown. In this embodiment, the lens 42 is a spherical dome or spherical cap, where the center 83 of the sphere is below the LED 41. Therefore, the diameter 84 of the base of the cap is smaller than twice the radius 85 of the sphere. In this embodiment, the light is refracted when leaving the lens and is spread to the sides improving intermixing between multiple LED emitters reducing the bright spots created by discrete sources, which may be part of the LED 41. In a preferred embodiment, the diameter of the bottom aperture may be 7.5 mm, while the radius of the sphere is 4.8 mm.

Figure 4:
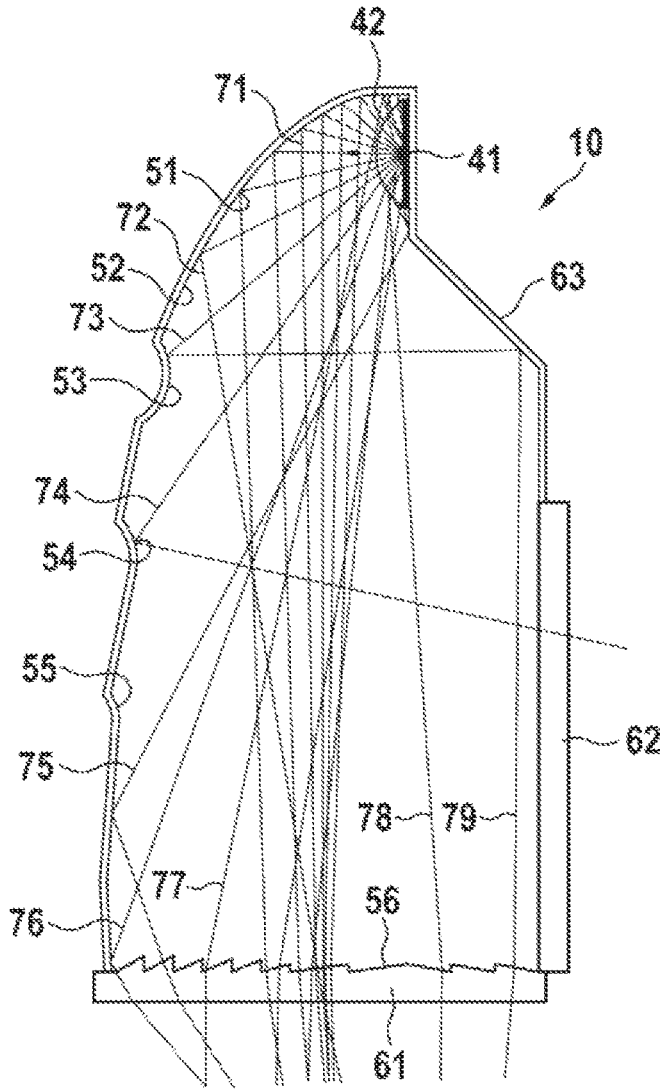
FIG. 4 shows ray traces of different rays.

In FIG. 4, ray traces of different rays are shown. First rays 71 which are deflected by the first paraboloidal section 51 are deflected through the lens body 61 at a first light exit surface. Second rays 72 are reflected by a second paraboloidal section 52 under an angle to the first rays 71, therefore spreading the light to a slightly different area of a surface to be illuminated. Preferably, both paraboloidal sections have their focus lines at the location of the LED center line. Most preferably, they are slightly rotated against each other. There may be further paraboloidal sections to further control the distribution of light. Third beams 73 are reflected by a first arc-shaped reflector 53, mainly towards a backside reflector 63 which further reflects the light through the lens body 61. Fourth rays 74 are reflected by a second arc-shaped reflector 54 mainly through an outside lens 62. Similarly, there may be rays reflected by the first arc-shaped reflector 53 which also may propagate through the outside lens 62. Generally, the arc-shaped reflectors 53, 54, and 55 are reflecting parts of the light through the outside lens 62, by means of the backside reflector 63 or directly through the lens body 61, as shown by rays 75 and 76.

Figure 5:
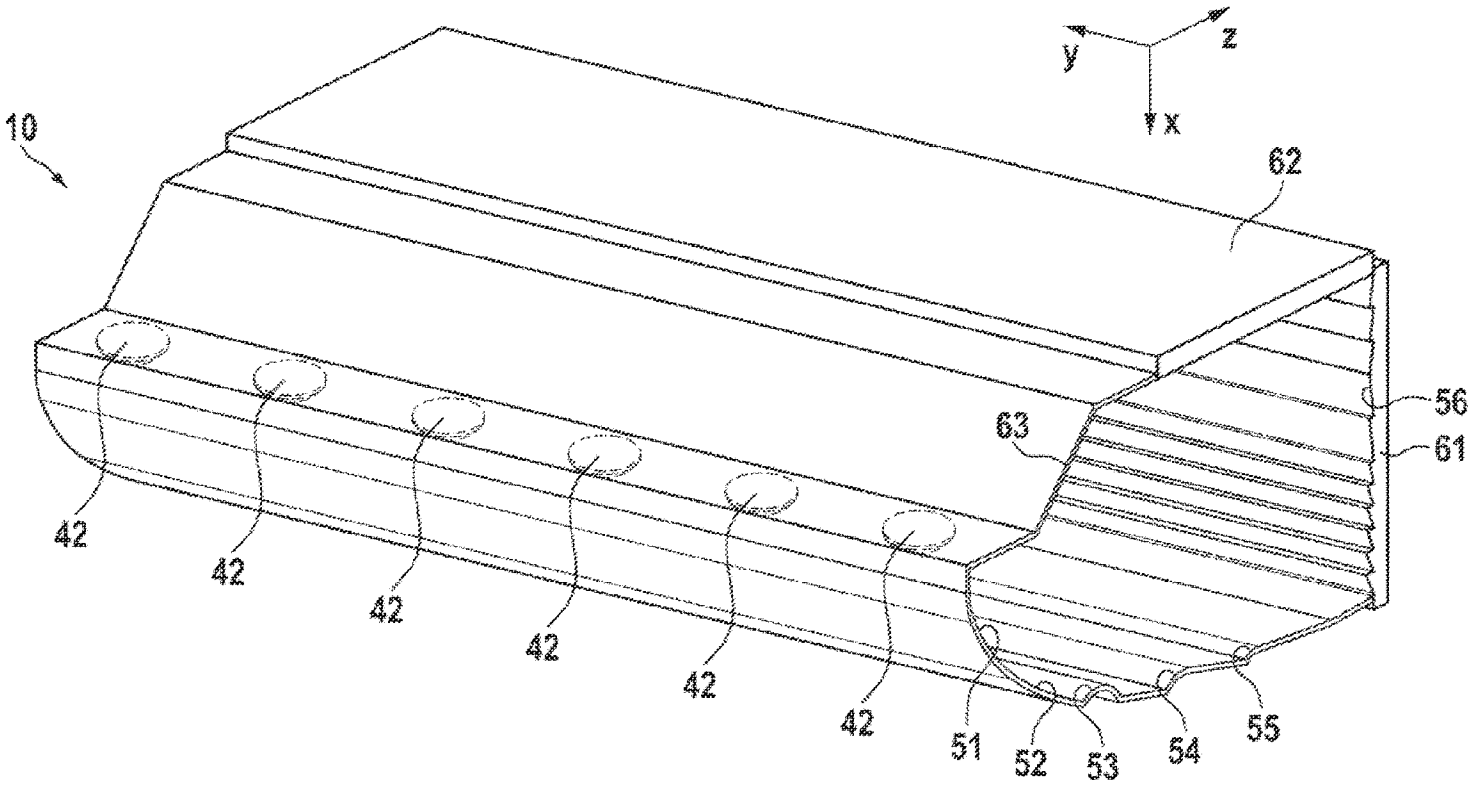
FIG. 5 shows an extruded profile of the LED lamp.

In FIG. 5, an extruded profile of the LED lamp is shown. The lamp forms a hollow structure with reflecting side walls 51, 52, 53, 54, 55, and 63, and lenses 61, 62. Along the length of the profile, there may be a plurality of LEDs and LED lenses 42 distant from each other.

Figure 6:
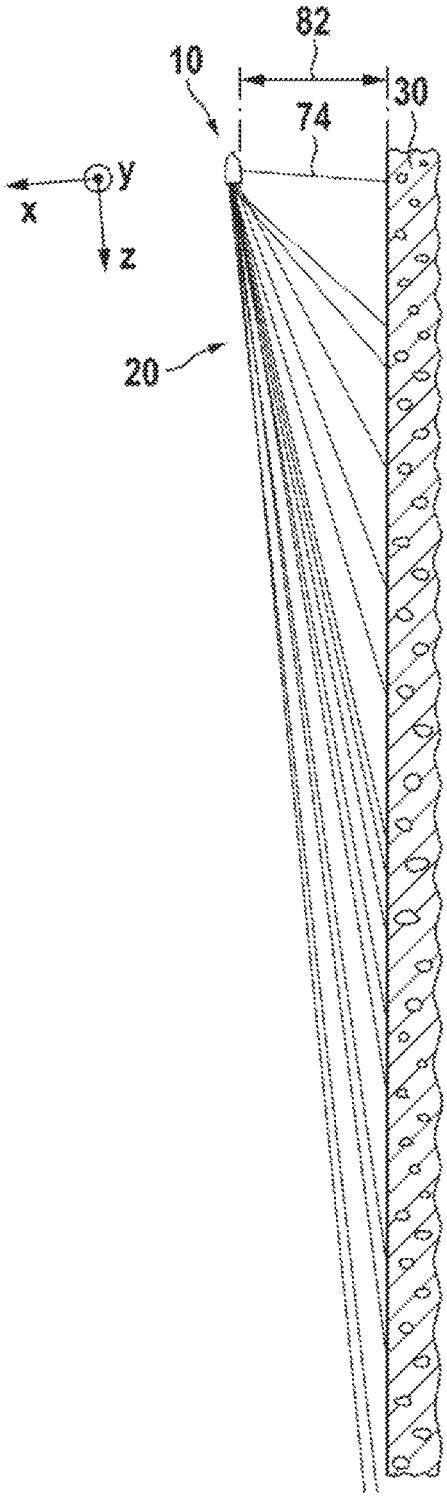
FIG. 6 shows an LED lamp illuminating a wall.

In FIG. 6, an LED lamp 10 is shown illuminating a plane or wall 30. The lamp is mounted distant from the wall under a setback distance 82. There is a plurality of light rays 20 as described before, which are exiting the lamp 10 through the lens body 61. There are further rays, like light rays 74 exiting the lamp body through outside lens 62.

The embodiment shown herein provides a good color mixing of the light generated by a plurality of LED emitters, herein referred to as LED 41, which are mounted under a lens 42, and provides a uniform light distribution over a surface, like a wall.

It will be appreciated to those skilled in the art having the benefit of this disclosure that this invention is believed to provide optics for LED lighting with color mixing properties. Specifically, color mixing optics are disclosed herein for producing a uniform intensity distribution and a uniform color distribution throughout the entire beam pattern produced by a multi-color LED light source. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

[1. A LED lamp for illuminating a surface comprising a body further comprising:

a plurality of multi-color LED light sources;

a spherical cap lens covering each of the plurality of multi-color LED light sources and having a radius that is larger than a radius of a base of the spherical cap lens;

wherein the spherical cap lens further comprising a plurality of spherical cap lenses covering respective ones of the plurality of multi-color LED light sources, and wherein each of the plurality of multi-color LED light sources and each of the plurality of spherical cap lenses covering respective ones of the plurality of multi-color LED light sources are arranged distant to each other on a LED mounting plane and are aligned with their centers to a common center line with at least one paraboloidal section having its focus at the common center line of the plurality of multi-color LED light sources;

at least one section with a mirrored surface, for reflecting the light emitted by the at least one multi-color LED light source, the mirrored surface section further comprising the at least one paraboloidal section and at least one arc shaped reflector; and at least one lens section forming an exit surface for the light.]

[2. The LED lamp of claim 1, wherein the body comprises a hollow profile.]

[3. The LED lamp of claim 1, wherein the body comprises an extruded profile.]

[4. The LED lamp of claim 1, wherein the body further comprises a backside reflector arranged behind a mounting plane of the plurality of multi-color LED light sources.]

[5. The LED lamp of claim 1, wherein the plurality of multi-color LED light sources, each comprising a plurality of LED chips.]

[6. The LED lamp of claim 1, wherein the mirrored surface is a total reflecting surface or a reflecting coated surface.]

[7. The LED lamp of claim 1, wherein the plurality of paraboloidal sections are provided being slightly rotated against each other.]

[8. The LED lamp of claim 1, wherein the at least one lens section comprises a Fresnel lens like structure.]

[9. The LED lamp of claim 1, wherein the at least one lens section comprises a prime lens for a main beam direction and an outside lens for an auxiliary beam direction is provided.]

[10. The LED lamp of claim 9, wherein the at least one arc shaped reflector deflects parts of the light emitted by the at least one multi-color LED light source to the outside lens and other parts of the light to the prime lens.]

*11. A linear LED fixture, comprising:*

*a plurality of LED light sources arranged linearly on a substrate forming a first plane, each of the plurality of LED light sources having a respective spherical cap lens disposed thereupon, wherein the spherical cap lens includes a base radius that is less than the spherical radius;*

*a lens body;*

*an outside lens disposed along a second plane parallel to the first plane; and*

*a first reflective surface, that includes:*

*a plurality of parabolic surfaces, the plurality of parabolic surfaces to reflect a first portion of light emitted by the plurality of LED light sources through the lens body to provide a first non-collimated light source; and*

*a plurality of convex surfaces, at least some of the plurality of convex surfaces to reflect a second portion of light emitted by the plurality of LED light sources through the outside lens to provide a second non-collimated light source.*

*12. The linear LED fixture of claim 11 further comprising:*

*a backside reflective surface disposed at a first angle with respect to the first plane, the backside reflective surface disposed proximate the substrate and the outside lens.*

*13. The linear LED fixture of claim 12 wherein at least some of the plurality of convex surfaces to reflect a third portion of light emitted by the plurality of LED light sources such that the third portion of light falls incident on the backside reflective surface.*

*14. The linear LED fixture of claim 13 wherein the backside reflective surface reflects the third portion of the light through the lens body.*

*15. The linear LED fixture of claim 14 wherein the lens body comprises a light entrance surface and a planar light exit surface.*

*16. The linear LED fixture of claim 15 wherein the light entrance surface of the lens body comprises a Fresnel lens-like light entrance surface.*

*17. The linear LED fixture of claim 15 wherein the outside lens comprises a light entrance surface and a planar light exit surface.*

*18. The linear LED fixture of claim 17 wherein the light exit surface of the lens body is disposed perpendicular to the light exit surface of the outside lens.*

*19. The linear LED fixture of claim 11 wherein the plurality of LED light sources comprises a plurality of multi-color LED light sources.*

*20. The linear LED fixture of claim 11 wherein the plurality of LED light sources is disposed at the focal point of at least one of the plurality of parabolic surfaces forming the first reflective surface.*

*21. The linear LED fixture of claim 11 wherein the plurality of LED light sources is disposed at the focal point of at least two of the plurality of parabolic surfaces forming the first reflective surface.*

*22. The linear LED fixture of claim 11 wherein the spherical cap lens includes a height radius perpendicular to the base radius that is less than one-half of the spherical radius.*

*23. A linear LED fixture, comprising:*

*a plurality of LED light sources arranged linearly to define a plane, each of the plurality of LED light sources having a respective spherical cap lens disposed thereupon, each cap lens having a base diameter and a height radius less than half of the base diameter;*

*a plurality of parabolic surfaces to reflect a first portion of light emitted by the plurality of LED light sources toward a first lens oriented perpendicular to the plane; and*

*a plurality of convex surfaces to reflect a second portion of light emitted by the plurality of LED light sources toward a second lens oriented parallel to the plane.*

*24. The linear LED fixture of claim 23 wherein the first lens comprises a Fresnel lens like structure.*

*25. The linear LED fixture of claim 23 wherein the first lens provides non-collimated light.*

*26. The linear LED fixture of claim 23 further comprising a backside reflective surface, wherein light reflected onto the backside reflective surface is reflected toward the first lens.*

*27. The linear LED fixture of claim 26 wherein the backside reflective surface is adjacent to the second lens.*

*28. The linear LED fixture of claim 27 wherein the backside reflective surface and second lens are oriented behind the plane.*

*29. The linear LED fixture of claim 23 the plurality of LED light sources comprises a plurality of multi-color LED light sources.*

*30. The linear LED fixture of claim 23 wherein light emitted by the plurality of LED light sources is refracted when leaving the respective spherical cap lenses.*

* * * * *